April 25, 1950     C. P. KRIEGER, JR     2,505,122
TRAINING IMPLEMENT FOR INFANTS
Filed May 26, 1947
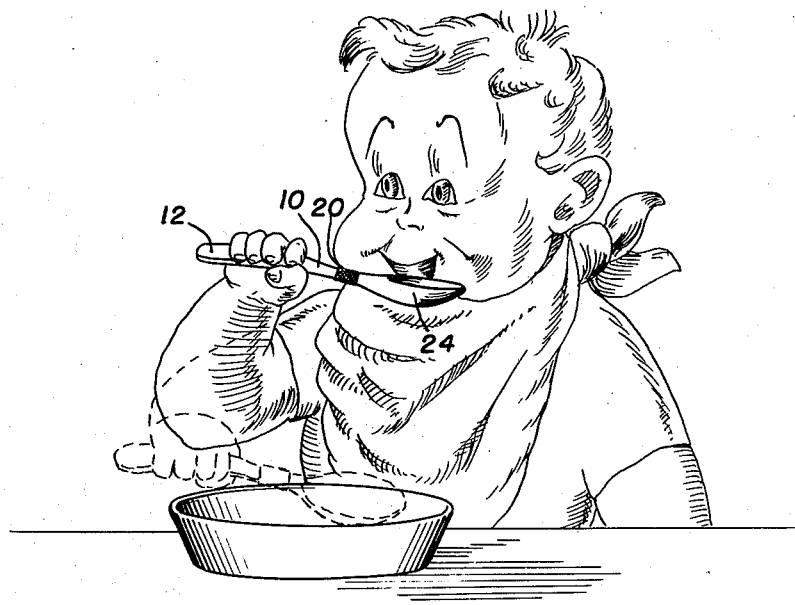
Fig. 1.
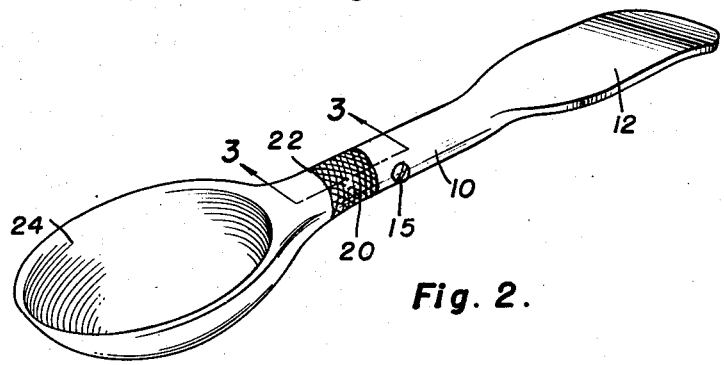
Fig. 2.
Fig. 3.
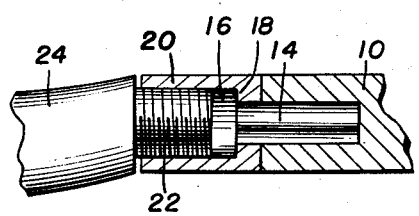
*Inventor*
Conrad P. Krieger, Jr.
By *Clarence A. O'Brien and Harvey B. Jacobson*
                                 *Attorneys*

Patented Apr. 25, 1950

2,505,122

UNITED STATES PATENT OFFICE 2,505,122

TRAINING IMPLEMENT FOR INFANTS

Conrad P. Krieger, Jr., Cleveland, Ohio

Application May 26, 1947, Serial No. 750,507

3 Claims. (Cl. 30—1)

This invention relates to new and useful improvements in training implements for infants and the primary object of the present invention is to provide a novel feeding implement for minimizing the time required for infants to learn to feed themselves.

Another important object of the present invention is to provide a training fork and spoon for infants that is so designed to be properly balanced for whatever natural grip the infant may place on the handle of the implement.

A further object of the present invention is to provide a feeding implement for infants including novel locking means for attaching a spoon or the like to a handle.

A still further aim of the present invention is to provide an article of the class described, that is simple and practical in construction, reliable and effective in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the implement in use;

Figure 2 is a perspective view of the training implement; and,

Figure 3 is an enlarged vertical longitudinal sectional view taken on line 3—3 of Figure 2.

Referring now to the drawings in detail, wherein for the purpose of illustration, there is disclosed a preferred embodiment of the present invention, the numeral 10 represents a handle preferably circular in cross section at its inner end and terminating at the other end in an enlarged substantially flat rectangular hand grip 12.

One end of a pin 14 is secured to handle 10 by a rivet 15 or in a suitable manner. The head end 16 of this pin bears against an internal shoulder 18 at one end of an internally threaded sleeve 20 having a roughened outer end surface, for swivel engagement of the sleeve on the pin.

An externally threaded shank 22 carried by the mouth engaging implement 24 is receivably engaged in the threaded bore of the sleeve.

By unscrewing the implement from the sleeve the balancing of the implement relative to the hand gripping portion 12 can be varied or adjusted. For locking the implement against the handle to prevent swivel movement of the implement relative to the handle, the shank is tightened in the sleeve to frictionally bear against the head 16 of the pin.

Shoulder 18 or the head 16 of the pin may be provided with a roughened surface to frictionally engage the adjacent surface of the other member to retard the swivel movement of the sleeve relative to the pin, if it is desirable to do so.

In use of the device, as previously described, the implement 24 will remain substantially in a horizontal plane relative to the handle, thereby eliminating waste of food placed on the implement and unnecessarily spoiling of infant's clothing. Also the spoon or fork will be so adjusted to balance properly to counteract the poor wrist control of the infant.

The handle, hand gripping portion and implement are preferably constructed of a light weight material, such as wood, and the sleeve 20, handle 10 and shank of the implement are peripherally similar to provide a smooth outer surface for the entire article.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. A training device for infants comprising a handle having a flat hand-gripping portion at one end thereof, a socket provided in the remaining end of said handle, a cylindrical pin having one end fixed in said socket, the remaining end of said pin projecting outwardly from said handle and including a head portion, an internally threaded sleeve having an internal shoulder at one end for engaging the head portion of said pin to limit outward movement of said sleeve relative to said handle, a mouth engaging element, and an externally threaded shank integrally formed with said implement receivably engaged in said sleeve, said implement being locked to said handle upon tightening of said sleeve for engagement of said shank with the head portion of said pin.

2. The combination of claim 1 wherein the outer surface of said sleeve is flush with the outer surface of said handle.

3. The combination of claim 1 wherein said implement includes a bearing shoulder adjacent said shank for engaging one end of said sleeve.

CONRAD P. KRIEGER, Jr.

REFERENCES CITED

The following references are of record in the file of this patent:

UNITED STATES PATENTS

| Number | Name | Date |
|---|---|---|
| 659,341 | Dodd et al. | Oct. 9, 1900 |
| 1,550,069 | Goolsby et al. | Aug. 18, 1925 |